United States Patent
Kikuchi

(10) Patent No.: US 10,616,246 B2
(45) Date of Patent: Apr. 7, 2020

(54) SDN CONTROLLER

(71) Applicant: Allied Telesis Holdings K.K., Tokyo (JP)

(72) Inventor: Yohei Kikuchi, Tokyo (JP)

(73) Assignee: ALLIED TELESIS HOLDINGS K.K., Tokyo (JP)

( * ) Notice: Subject to any disclaimer, the term of this patent is extended or adjusted under 35 U.S.C. 154(b) by 83 days.

(21) Appl. No.: 15/456,174

(22) Filed: Mar. 10, 2017

(65) Prior Publication Data

US 2017/0331842 A1 Nov. 16, 2017

(30) Foreign Application Priority Data

May 11, 2016 (JP) .................................. 2016-95064

(51) Int. Cl.
*H04L 29/06* (2006.01)
*H04L 29/12* (2006.01)
*H04L 12/823* (2013.01)

(52) U.S. Cl.
CPC .......... *H04L 63/1416* (2013.01); *H04L 47/32* (2013.01); *H04L 61/2514* (2013.01);
(Continued)

(58) Field of Classification Search
CPC ............. H04L 63/1416; H04L 61/2514; H04L 63/0227; H04L 63/1425; H04L 47/32; H04L 63/0209
See application file for complete search history.

(56) References Cited

U.S. PATENT DOCUMENTS

| 2003/0065785 A1* | 4/2003 | Jain ................... H04L 29/12066 709/227 |
| 2015/0295885 A1* | 10/2015 | Congdon ............ H04L 61/2557 370/392 |

(Continued)

FOREIGN PATENT DOCUMENTS

| JP | 2011109186 | 6/2011 |
| JP | 2015127843 | 7/2015 |

(Continued)

OTHER PUBLICATIONS

Open Networking Foundation (ONF) Solution Brief, SDN Security Considerations in the Data Center, Oct. 8, 2013, 12 pages. (Year: 2013).*

(Continued)

*Primary Examiner* — Chau Le
*Assistant Examiner* — Han Yang
(74) *Attorney, Agent, or Firm* — Brooks Acordia IP Law, PC; Michael Zarrabian

(57) ABSTRACT

An SDN controller used in a network constructed with an SDN, the SDN controller causes a computer to function as an address information specifying processing unit which specifies, based on a global address of an illegal attack server received from a threat detection system, communication with the received global address among communication in the network, and specifies a local address of a communication partner of the global address in the specified communication, a terminal identification information specifying processing unit which specifies terminal identification information on a client terminal to which the specified local address is assigned, and a security processing unit which passes to an edge network device, based on the specified terminal identification information, a control instruction to (Continued)

perform predetermined control processing to communication of the client terminal.

6 Claims, 9 Drawing Sheets

(52) U.S. Cl.
CPC ...... *H04L 63/0209* (2013.01); *H04L 63/0227* (2013.01); *H04L 63/1425* (2013.01)

(56) References Cited

U.S. PATENT DOCUMENTS

| | | | | |
|---|---|---|---|---|
| 2016/0127241 | A1* | 5/2016 | Hwang | H04L 47/122 370/237 |
| 2017/0134416 | A1* | 5/2017 | Kawakita | H04L 45/38 |
| 2017/0195292 | A1* | 7/2017 | Pham | H04L 63/0245 |
| 2017/0331853 | A1* | 11/2017 | Kawakita | H04L 63/1416 |

FOREIGN PATENT DOCUMENTS

| | | | |
|---|---|---|---|
| JP | 2015127843 A | * | 7/2015 |
| WO | 2010103909 A1 | | 9/2010 |

OTHER PUBLICATIONS

"SDN: Software Defined Networks" by Ken Gray, Thomas D. Nadeau, Chapter 4. SDN Controllers (https://www.oreilly.com/library/view/sdn-software-defined/9781449342425/ch04.html), Published by O'Reilly Media, 6 pages (Year: 2013).*

"Abstractions for Software-Defined Networks" by Martin Casado, Oct. 2014, CACM, 10 pages (Year: 2014).*

"Software-Defined Networking" by Nate Foster, 2018, Cornell CS 6114 lecture 04, 8 pages (Year: 2018).*

"OpenFlow: Enabling Innovation in Campus Networks" by Nick McKeown, ACM SIGCOMM Computer Communication Review, vol. 38, No. 2, Apr. 2008, 6 pages (Year: 2008).*

* cited by examiner

SDN CONTROLLER

BACKGROUND

Technical Field

The present invention relates to a software defined network (SDN) controller used in an SDN. The present invention particularly relates to an SDN controller having a function to maintain security by specifying, when a computer terminal (hereinafter, referred to as a "client terminal") in a private network, such as a LAN, receives a threat, such as an illegal attack, especially from a computer in a global network, such as the internet, the client terminal damaged in the private network and performing disconnection, isolation, or the like (hereinafter, "disconnection or the like") of the communication thereof.

Related Art

There is address information, such as an IP address, to specify a computer in a network. The address information includes a local address used in a private network and a global address used in a global network. When a client terminal in a private network accesses a global network, it is common that a local address of the client terminal is NAT/PAT-translated into the global address, and the translated address is used for the access.

The NAT/PAT translation is performed by a device called a gateway, and the gateway includes a NAT/PAT table in which the local address and the global address are associated with each other.

Recently, a cloud service has been rapidly widespread, and a technique called an SDN is used to facilitate the management of the complexed machine configuration and network configuration (WO2010/103909). The OpenFlow disclosed in WO2010/103909 is one of SDNs.

On the other hand, various cyber attacks are launched in the global network to perform an illegal operation and the like to the client terminal. Thus, a network manager operates a system to detect a threat, such as a cyber attack, (hereinafter, referred to as a "threat detection system") or a security system having various functions in order to defend their own private network and client terminals therein against the cyber attack. The security system has a function for countermeasures against a firewall or spyware, a function for preventing virus infection, or the like as a role thereof. Such security systems are required to prevent infection to other client terminals when a client terminal is infected with a virus.

Thus, conventional security systems or threat detection systems mainly operate in a private network. However, security systems or threat detection systems have sometimes operated outside a private network recently to handle various threats and to monitor a plurality of private networks.

The invention disclosed in JP 2011-109186 A identifies a host (client terminal) which transmits a packet by identifying and translating a transmission source MAC address included in header information in the packet in communication of a router in a LAN.

SUMMARY

When a threat detection system operates outside a private network, for example, in a global network or a DMZ, a threat from the global network can be detected. However, when a client terminal in the private network is infected with a virus which leaks information, the event of the information leakage can be specified, but the address information on the infected client terminal (hereinafter, referred to as a "suspicious terminal") cannot be specified only from the event if the threat detection system is provided outside the private network (outside a gateway to perform NAT/PAT translation). This is because that the threat detection system can specify only the global address of the suspicious terminal but cannot specify the local address, and cannot identify which client terminal in the private network is the suspicious terminal. FIG. 10 schematically illustrates the above.

From the above reason, when a client terminal in a private network is damaged, a suspicious terminal cannot be specified, and which may lead to the expansion of damage, such as causing other client terminals to be infected with a virus. FIG. 11 schematically illustrates the above.

When communication is performed between hosts which belong to a different network, conventionally, a NAT router (packet relay device) has transmitted the MAC address of the router to which the MAC address of a host at a transmission starting end is rewritten as a transmission source MAC address at the time when a packet is transmitted from the host to the NAT router. Thus, when a packet is transmitted from another host in the network to which the host at the transmission starting end belongs, it has been impossible to identify these hosts. The invention disclosed in JP 2011-109186 A resolves the problem. In other words, the problem is resolved by transmitting, as the transmission source MAC address, not the MAC address of the router, but the MAC address of the host by the NAT router when the host at the transmission starting end transmits a packet to the NAT router.

However, the MAC address of the host which can specify the host constantly flows to the global network outside the NAT router, which enables an illegal access to the host using the address, and causes a security problem. Furthermore, breakdown or a setting error of an access management device may transmit an irregular illegal packet to the global network, and which is a systemically undesirable problem.

It is impossible to prevent virus infection in a LAN, in the case of, for example, communication in the LAN without interposing a device which monitors a network. Moreover, when an IP address of a client terminal is changed, there is a problem that the communication cannot be disconnected.

The inventor has taken the above problems into consideration and devised an SDN controller according to an embodiment of the present invention.

A first aspect of the present invention is an SDN controller used in a network constructed with an SDN, the SDN controller causes a computer to function as an address information specifying processing unit which specifies, based on a global address of an illegal attack server received from a threat detection system, communication with the received global address among communication in the network, and specifies a local address of a communication partner of the global address in the specified communication, a terminal identification information specifying processing unit which specifies terminal identification information on a client terminal to which the specified local address is assigned, and a security processing unit which passes to an edge network device, based on the specified terminal identification information, a control instruction to perform predetermined control processing to communication of the client terminal.

A second aspect of the present invention is an SDN controller used in a network constructed with an SDN, the SDN controller causes a computer to function as a terminal identification information specifying processing unit which specifies, based on a global address of an illegal attack server received from a threat detection system, communication with the received global address among communication in the network, and extracts, from the specified communication, terminal identification information on a client terminal which is a transmission source, and a security processing unit which passes to an edge network device, based on the extracted terminal identification information, a control instruction to perform predetermined control processing to communication of the client terminal.

With the configurations of these aspects of the present invention, the global address of a server (server to be a communication partner) which launches an attack causing a threat is identified, and thereby it is possible to specify terminal identification information on a client terminal (suspicious terminal) using the local address to communicate with the global address. Thus, it is possible for an edge network device to control communication only of the suspicious terminal. As a result, it is possible to control communication only of the suspicious terminal when the edge network device is used by a plurality of client terminals, and to operate client terminals which are not in the state of infection or the like.

In the aspects of the present invention, the SDN controller may notify, as the control processing, other edge network devices in the network managed by the SDN controller of the specified terminal identification information.

With the configurations of the aspects of the present invention, it is possible to control the suspicious terminal when the edge network device is changed by, for example, the move of the suspicious terminal.

In the aspects of the present invention, the SDN controller may perform, as the control processing, any one or more of disconnection of communication or isolation of the client terminal, or detection, isolation, or restoration of a virus.

As the control processing, the processing in the aspects of the present invention is used for example.

In the aspects of the present invention, the SDN controller may write, as the control processing, a rule to discard a packet from the client terminal having the terminal identification information in a rule table of the edge network device.

With the configurations of the aspects of the present invention, it is possible to discard a packet without inquiring of the SDN controller about the processing of the packet by the edge network device. Thus, it is possible to reduce the load on the SDN controller.

Advantageous Effects of Invention

By using an SDN controller according to an embodiment of the present invention, it is possible to specify a client terminal damaged in a private network. Then, by specifying the damaged client terminal, it is possible to prevent infection or the like to other client terminals. Furthermore, the present invention can be applied when an IP address of the client terminal is changed by moving, for example, roaming.

DETAILED DESCRIPTION

Figure 1:
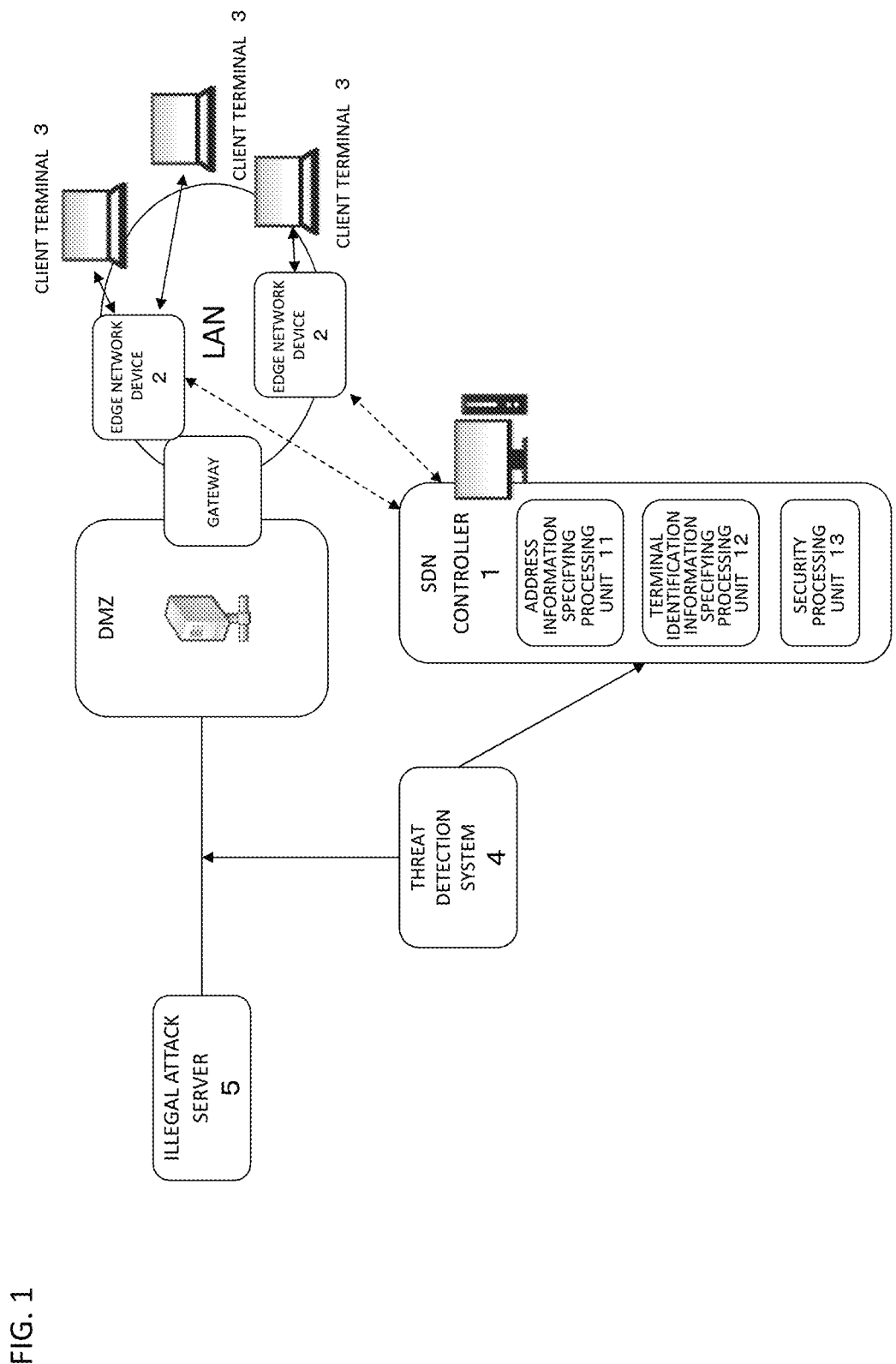
FIG. 1 is a diagram schematically illustrating an example of an entire configuration using an SDN controller according to an embodiment of the present invention.

FIG. 1 illustrates an example of an entire configuration using an SDN controller 1 according to an embodiment of the present invention. In FIG. 1, there is a client terminal 3 (terminal A) and a router which is a gateway to perform NAT/PAT translation in a LAN which is a private network constructed by a company or the like. There is provided a DMZ at the boundary between the private network and a global network.

In this embodiment of the present invention, a network management technique by an SDN is used, and the communication in one or more private networks is controlled by the SDN controller 1. The SDN controller 1 manages the communication in the network constructed with the SDN. The SDN controller 1 is software to control and manage the network. Note that, the SDN controller 1 operates by executing the software in the computer. When the OpenFlow is used as the SDN, an OpenFlow controller becomes the SDN controller 1.

In the network constructed with the SDN, the client terminals 3 in the private network are connected to the private network through an edge network device 2. The edge network device 2 is a network device to transfer data, and connected with the client terminal 3 as a terminal end of the communication. The edge network device 2 stores a rule table (flow entry) indicating a rule showing how to control a packet received from the client terminal 3, and processed the packet according to the rule. When a rule is not in the rule table, the processing of the packet is suspended, and the suspended packet is processed according to a control instruction from the SDN controller 1 after inquiring of the SDN controller 1. Alternatively, in some cases, the packet is transmitted to the SDN controller 1 and rewritten by the SDN controller 1, and the rewritten packet is received from the SDN controller 1 and processed. When the OpenFlow is used as the SDN, an OpenFlow switch becomes the edge network device 2.

Figure 2:
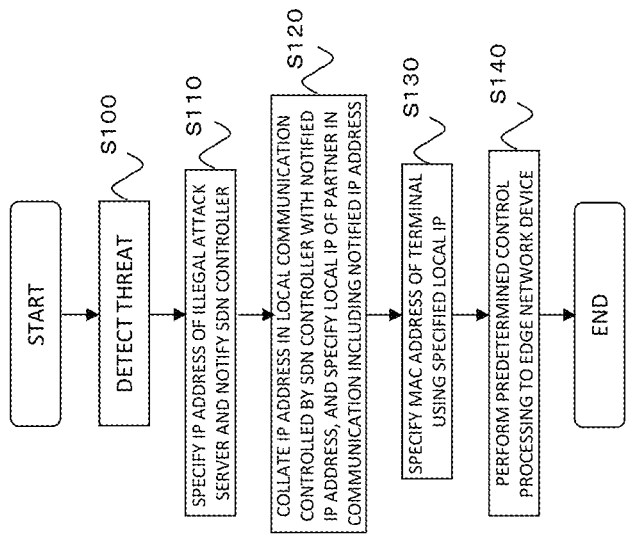
FIG. 2 is a diagram schematically illustrating an example of a hardware configuration of a computer according to the embodiment of the present invention.

Note that, the embodiment of the present invention is implemented by various computers, such as a server and a personal computer. FIG. 2 illustrates an example of a hardware configuration of a computer. The computer includes an arithmetic device 70, such as a CPU to execute arithmetic processing of a program, a storage device 71, such as a RAM or a hard disk to store information, a display device 72, such as a display, an input device 73, such as a keyboard or a pointing device (a mouse or a numeric key), and a communication device 74 to transmit or receive a processing result of the arithmetic device 70 or the information to be stored in the storage device 71 through a network, such as the internet or a LAN.

Note that, FIG. 1 illustrates the case in which each device is implemented by one computer, but the function may be implemented by being dispersedly arranged in a plurality of computers. Furthermore, the functions of the means in the present invention are logically distinguished from each other, but may be physically or practically in the same region.

The processing units in the present invention are logically distinguished from each other, but may be physically or practically in the same region.

First Embodiment

The SDN controller 1 according to a first embodiment of the present invention includes, in a network constructed with an SDN as described above, an address information specifying processing unit 11, a terminal identification information specifying processing unit 12, and a security processing unit 13 as part of the management of the communication.

When the SDN controller 1 receives a global address of an illegal attack server 5 from a threat detection system 4, which will be described later, the address information specifying processing unit 11 monitors the communication to the global address and specifies a local address of a communication partner if the global address communicates (if receiving an inquiry about processing of a packet in communication in which the global address is the other partner).

The terminal identification information specifying processing unit 12 specifies, based on the local address of the communication partner specified by the address information specifying processing unit 11, terminal identification information, such as a MAC address of the client terminal 3 which uses the local address.

The security processing unit 13 performs control processing related to security based on the address information specified by the address information specifying processing unit 11 and/or the terminal identification information specified by the terminal identification information specifying processing unit 12. The control processing related to security is only required to be any control processing to defend against a threat, such as disconnection of communication, and detection, isolation, restoration, or the like of a virus (malware and the like).

The threat detection system 4 monitors the communication between the global network and the private network or the communication in the private network, and detects a threat, such as a cyber attack launched by the illegal attack server 5 from the global network. When detecting the threat, the threat detection system 4 notifies the SDN controller 1 of the global address of the illegal attack server 5. The cyber attack includes various types of attacks of, for example, a denial of service (Dos) attack, a distributed denial of service (DDoS) attack, a port scan attack, and a ping of death (PoD) attack, but is not limited to the above.

Figure 3:
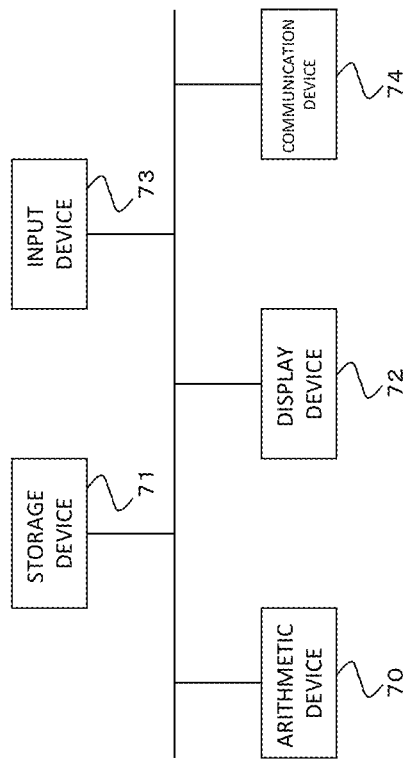
FIG. 3 is an example of a flowchart in the embodiment of the present invention.
Figure 4:
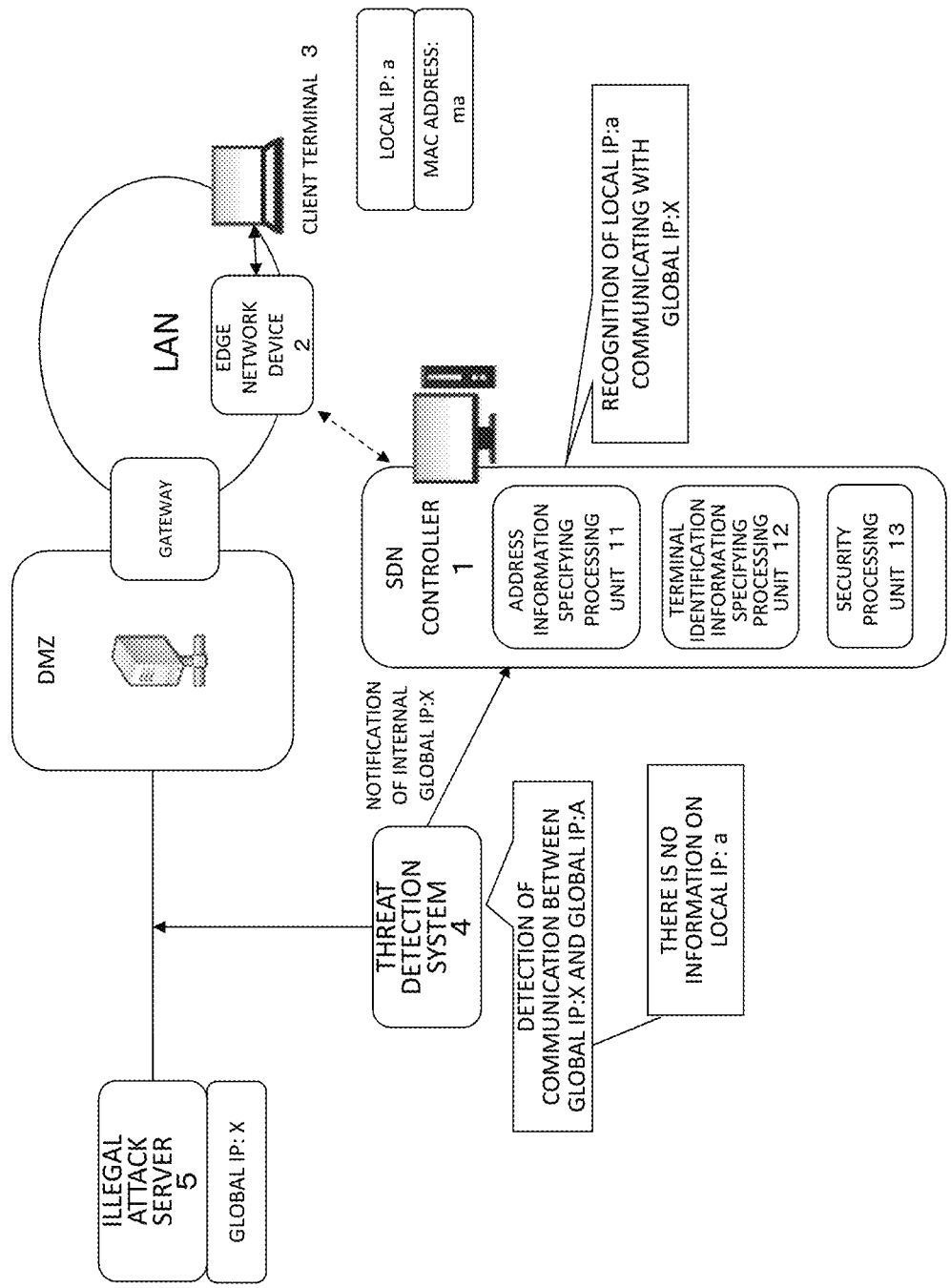
FIG. 4 is a diagram schematically illustrating a processing example using an SDN controller according to the embodiment of the present invention.

Next, a processing example using the SDN controller 1 according to the first embodiment of the present invention is described with reference to the flowchart of FIG. 3 and FIG. 4. In FIG. 4, it is assumed that the global address of the illegal attack server 5 is "X", the global address of the edge network device 2 through which the client terminal 3 in the private network communicates is "A", and the local address of the edge network device 2 is "a", and the MAC address of the client terminal 3 is "ma".

The threat detection system 4 monitors the communication between the private network and the global network, detects a threat from the illegal attack server 5 (S100), and specifies, from the packet, the global address "X" of the illegal attack server 5 and the global address "A" of a suspicious terminal. Then, the threat detection system 4 notifies the SDN controller 1 of the global address "X" of the illegal attack server 5 (S110).

When the SDN controller 1 receives the global address "X" of the illegal attack server 5 from the threat detection system 4, the address information specifying processing unit 11 of the SDN controller 1 recognizes the local communication in the private network controlled by the SDN controller 1, collates the global address in each local communication with the global address notified from the threat detection system 4, and specifies the local address of the partner in the corresponding local communication (S120). In other words, when receiving, from the edge network device 2, an inquiry about control processing of the packet in the local communication in which the global address is "X" among the local communication controlled by the SDN controller 1, the address information specifying processing unit 11 specifies the local communication. Then, the address information specifying processing unit 11 of the SDN controller 1 specifies the local address "a" of the communication partner of the local communication including the global address "X".

The local address "a" used by the suspicious terminal which is the client terminal 3 damaged by the attack from the illegal attack server 5 is specified accordingly.

Then, the terminal identification information specifying processing unit 12 of the SDN controller 1 inquires of the edge network device 2 which uses the local address "a" specified by the address information specifying processing unit 11 about the client terminal 3 which communicates using the local address "a", specifies the client terminal 3 as the suspicious terminal, and specifies and acquires the terminal identification information (MAC address and the like) "ma" of the suspicious terminal (S130).

Then, the security processing unit 13 performs, based on the local address "a" specified by the address information specifying processing unit 11, the control processing, such as disconnection or the like of the communication of the edge network device 2 using the local address "a" (S140). Alternatively, the security processing unit 13 passes the MAC address "ma" specified by the terminal identification information specifying processing unit 12 to the edge network device 2, and further passes the control instruction to perform disconnection or the like of the communication with the client terminal 3 having the MAC address "ma" (that is, the suspicious terminal), and the edge network device 2 performs disconnection or the like of the communication with the client terminal 3 having the MAC address "ma" (S140). Furthermore, the security processing unit 13 writes, based on the control instruction, a rule to perform the control to disconnect (discarding or the like) the packet having the MAC address "ma" of the transmission source in the rule table, such as the flow entry in the edge network device 2.

Thereafter, the packet having the MAC address "ma" is disconnected by the edge network device 2 without inquiring of the SDN controller 1 accordingly.

Figure 5:
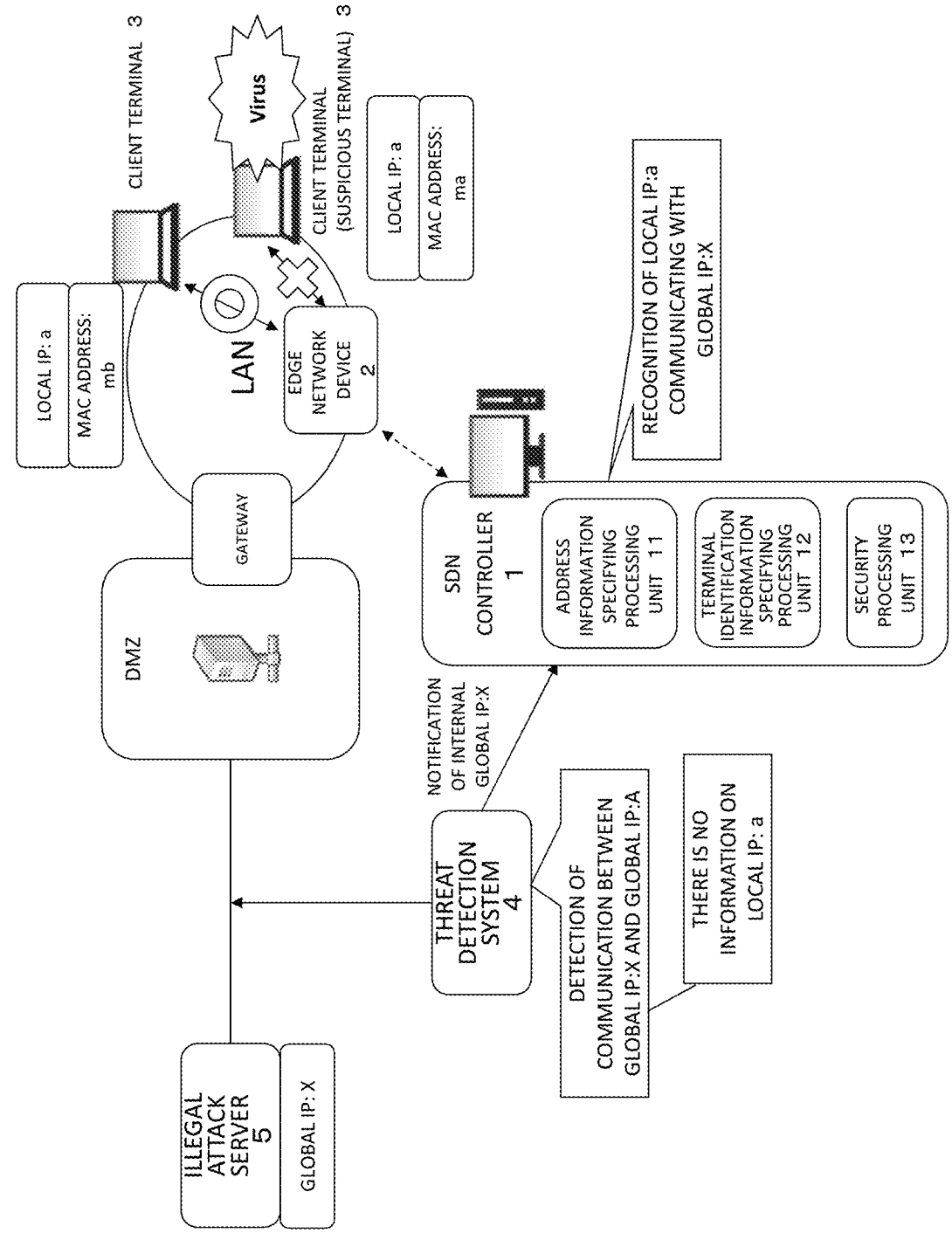
FIG. 5 is a diagram schematically illustrating that disconnection or the like only of a suspicious terminal is performed when a plurality of client terminals communicates through an edge network device.

By the above described processing by the security processing unit 13, it is possible to perform control processing of communication in units of edge network devices or suspicious terminals. Especially, since the edge network device 2 controls the communication based on the MAC address of the suspicious terminal, disconnection or the like of the communication only of the suspicious terminal is performed when the client terminals 3 communicate through the edge network device 2, and thereby it is possible for the same edge network device 2 not to affect the communication of the normal client terminal 3. FIG. 5 schematically illustrates the above.

In other words, when the edge network device 2 is used by a plurality of client terminals 3, the local address thereof is the same "a". However, the MAC address is different from each client terminal 3 ("ma", "mb"), and the communication only with the MAC address of the client terminal 3 specified as the suspicious terminal by the terminal identification information specifying processing unit 12 can be disconnected.

Figure 6:
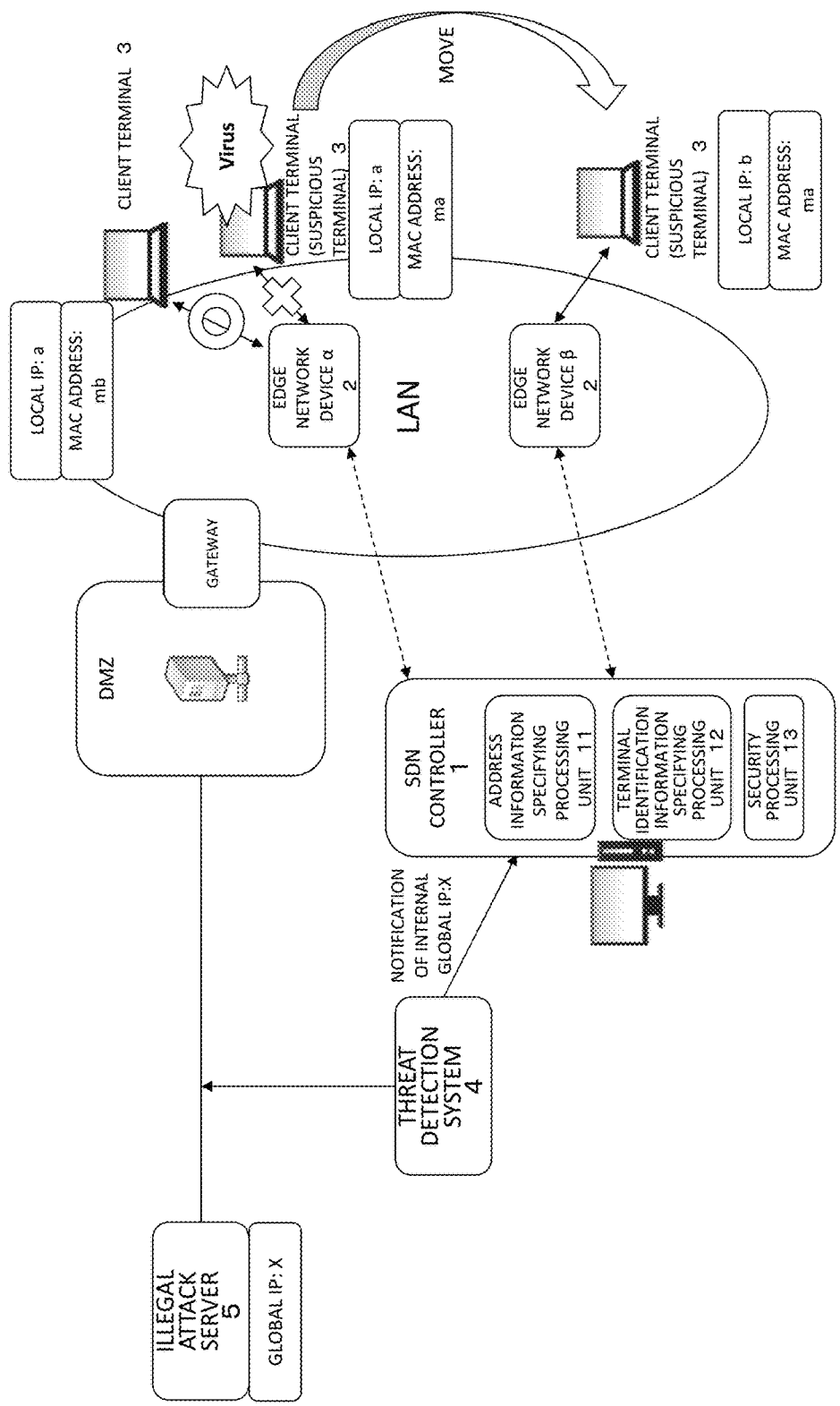
FIG. 6 is a diagram schematically illustrating that disconnection or the like of communication can be performed when a suspicious terminal changes an edge network device.

FIG. 6 illustrates another case of control of the SDN controller 1 according to the embodiment of the present invention. FIG. 6 illustrates the case in which the suspicious terminal initially uses an edge network device 2α having a local address "a", and then the suspicious terminal moves and uses an edge network device 2β having a local address "b". For example, the case is applied to, but is not limited to, that the suspicious terminal is a portable communication terminal, such as a smart phone, and the edge network device 2 is an access point.

In FIG. 6, as described above, the address information specifying processing unit 11 of the SDN controller 1 specifies the local address "a", and thereby the terminal identification information specifying processing unit 12 specifies the MAC address "ma" of the suspicious terminal. Then, the SDN controller 1 manages the MAC address to whose communication is the target to perform disconnection or the like, and the security processing unit 13 notifies each edge network device 2 in the private network of the MAC address. Each edge network device 2 which receives the notification writes a rule to perform the control to disconnect the packet having the MAC address "ma" of the transmission source in the rule table, such as a flow entry. By the above processing, although the suspicious terminal changes the edge network device 2α to the edge network device 2β, the edge network device 2β acquires the MAC address "ma" at the time of the communication with the suspicious terminal, and it is possible for the edge network device 2β to perform disconnection or the like of the communication without inquiring of the SDN controller 1.

Similarly, when a fixed IP address is assigned by a user who uses the suspicious terminal, the suspicious terminal is controlled with the MAC address, and it is possible to perform disconnection or the like of the communication with the edge network device 2.

Second Embodiment

Figure 7:
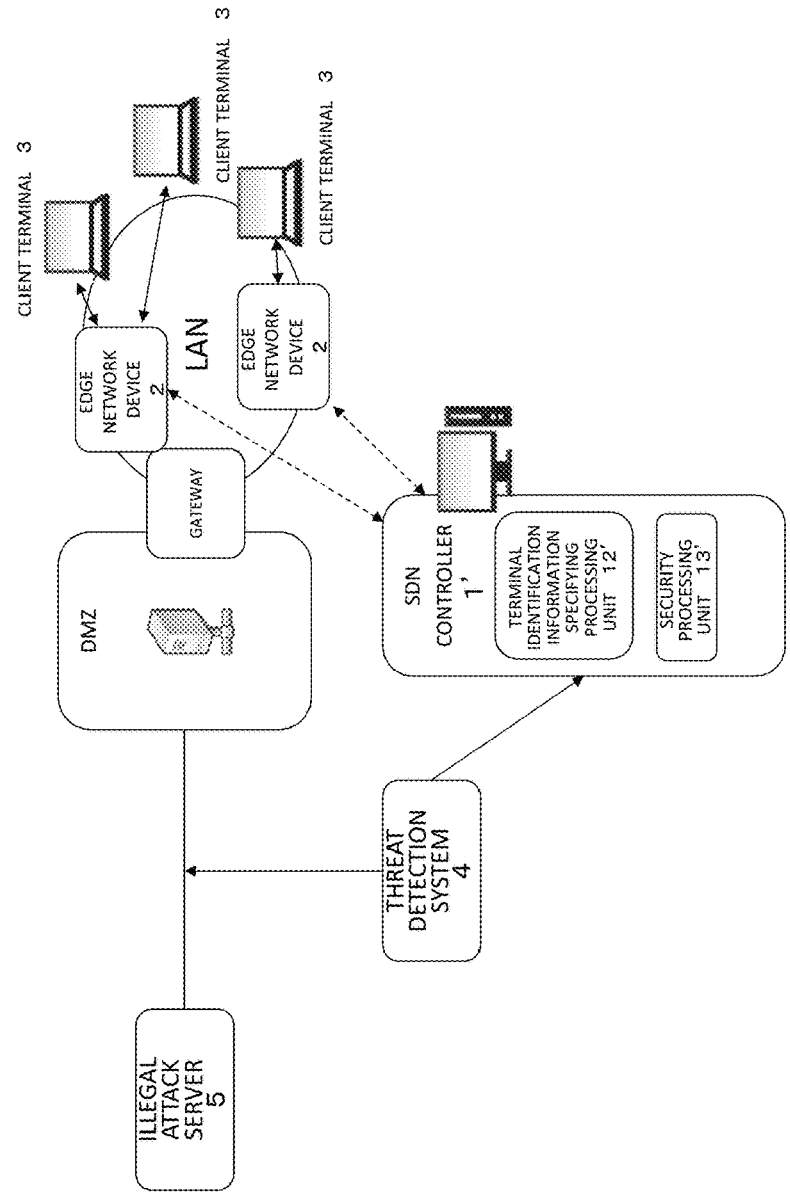
FIG. 7 is a diagram schematically illustrating an example of an entire configuration using an SDN controller according to another embodiment of the present invention.

Although the suspicious terminal is specified by specifying the local address of the client terminal 3 in the first embodiment of the SDN controller 1, the suspicious terminal may be specified without specifying the local address, and communication in which the MAC address is the transmission source may be disconnected. FIG. 7 illustrates the configuration in this case.

An SDN controller 1' in the present embodiment includes a terminal identification information specifying processing unit 12' and a security processing unit 13'.

When the SDN controller 1' receives a global address of an illegal attack server 5 from a threat detection system 4, the terminal identification information specifying processing unit 12' monitors the communication to the global address, determines a client terminal 3 which is a transmission source in a packet of the communication as a suspicious terminal, and extracts terminal identification information, such as the MAC address of the suspicious terminal, from the packet if the global address communicates (if receiving an inquiry about processing of the packet in the communication in which the global address is the other partner).

The security processing unit 13' performs control processing related to security based on the terminal identification information specified by the terminal identification information specifying processing unit 12'. The control processing related to security is only required to be any control processing to defend against a threat, such as disconnection of communication, and detection, isolation, restoration, or the like of a virus (malware and the like).

Figure 8:
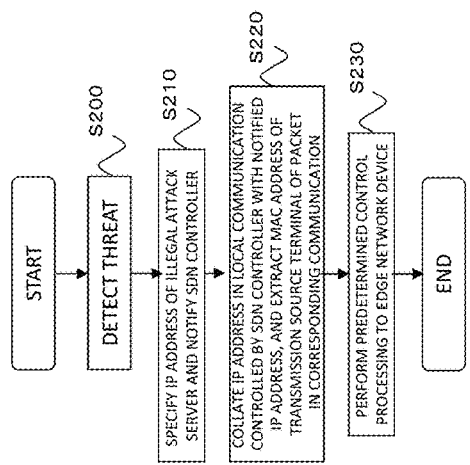
FIG. 8 is another example of a flowchart in the embodiment of the present invention.
Figure 9:
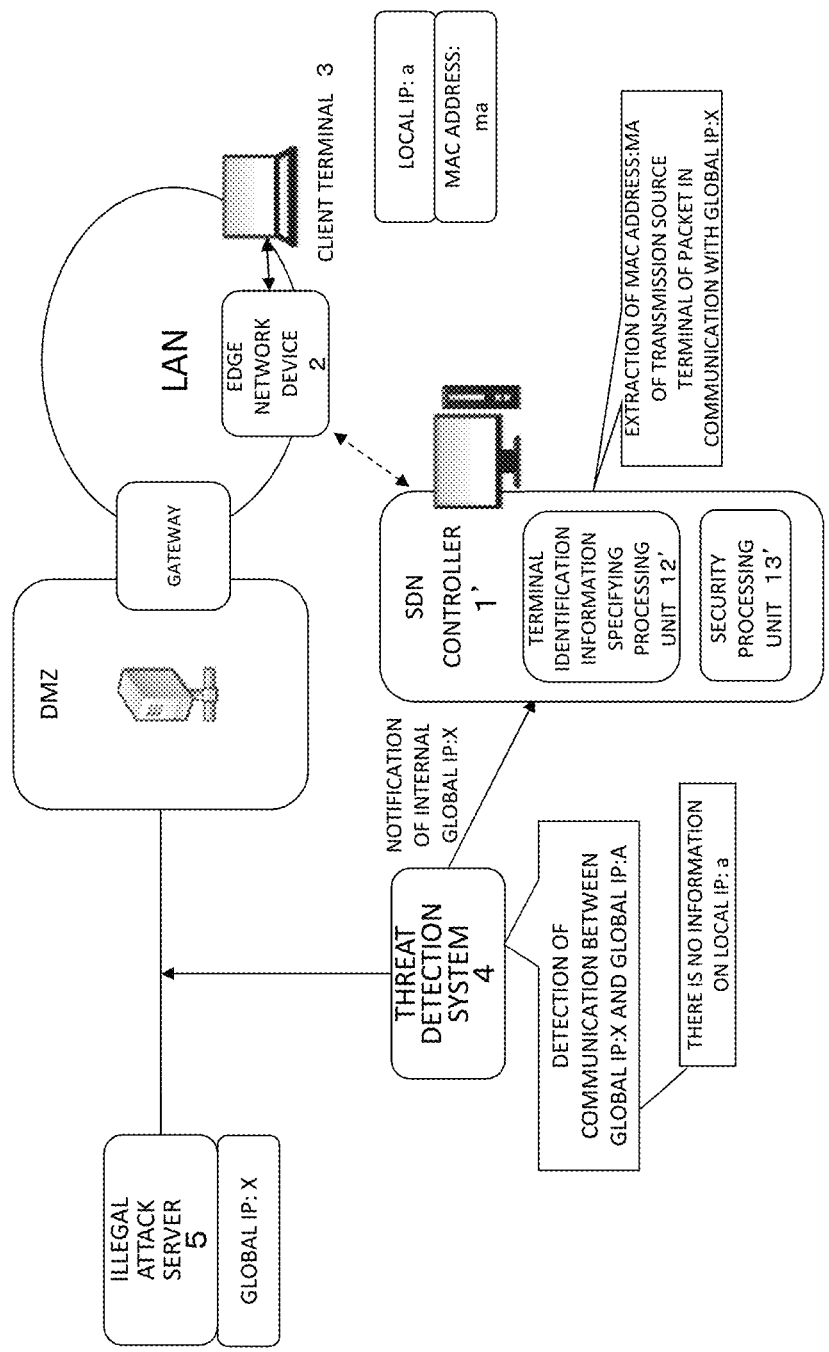
FIG. 9 is a diagram schematically illustrating another processing example using an SDN controller according to the embodiment of the present invention.
Figure 10:
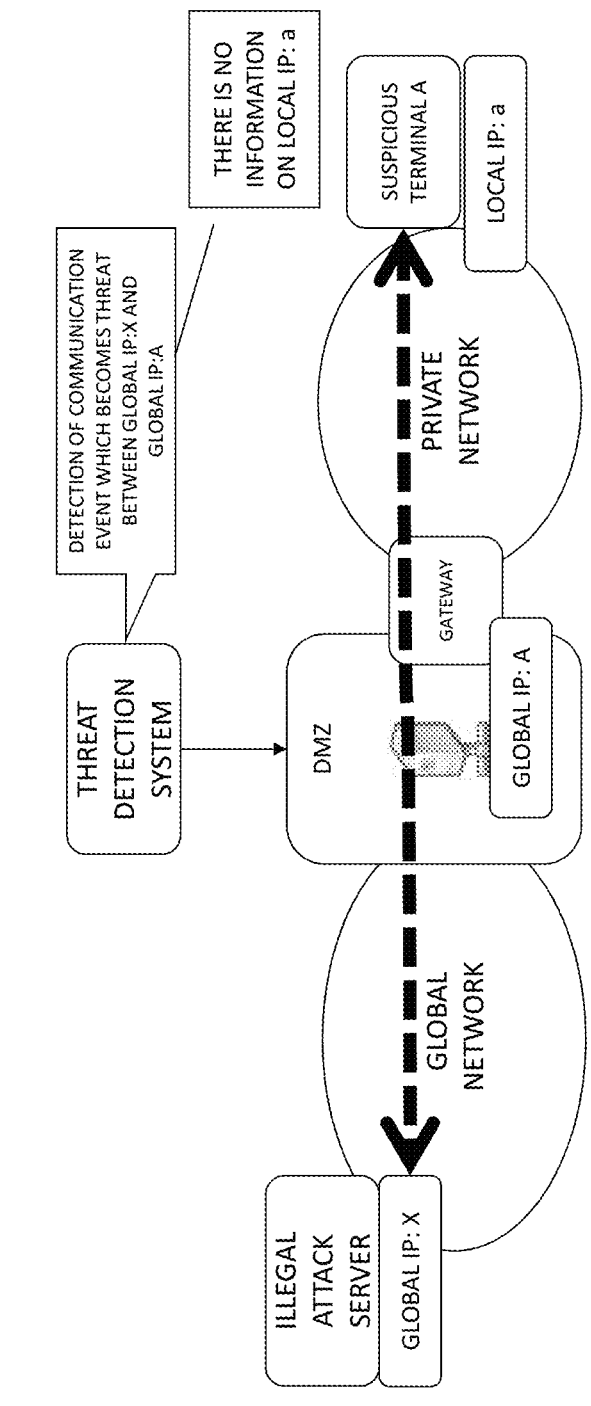
FIG. 10 is a diagram schematically illustrating a conventional example in which a suspicious terminal in a private network cannot be specified.
Figure 11:
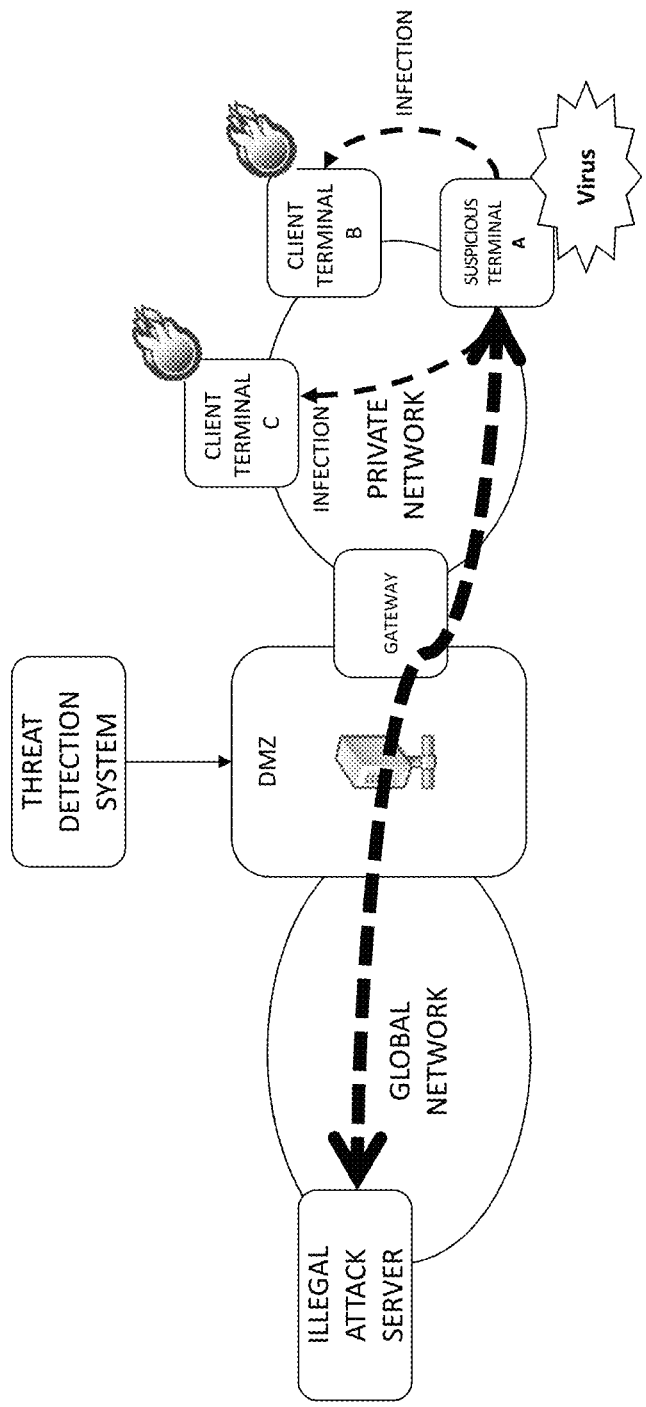
FIG. 11 is a diagram schematically illustrating a conventional example in which a suspicious terminal in a private network cannot be specified and other client terminals are infected with a virus.

Next, a processing example using the SDN controller 1' according to the second embodiment of the present invention is described with reference to the flowchart of FIG. 8 and FIG. 9. In FIG. 9, it is assumed that the global address of the illegal attack server 5 is "X", the global address of an edge network device 2 through which the client terminal 3 in the private network communicates is "A", and the local address of the edge network device 2 is "a", and the MAC address of the client terminal 3 is "ma".

The threat detection system 4 monitors the communication between the private network and the global network, detects a threat from the illegal attack server 5 (S200), and specifies, from the packet, the global address "X" of the illegal attack server 5. Then, the threat detection system 4 notifies the SDN controller 1' of the global address "X" of the illegal attack server 5 (S210).

When the SDN controller 1' receives the global address "X" of the illegal attack server 5 from the threat detection system 4, the terminal identification information specifying processing unit 12' of the SDN controller 1' recognizes the local communication in the private network controlled by the SDN controller 1', collates the global address in each local communication with the global address notified from the threat detection system 4, and extracts the MAC address of the transmission source terminal of the packet in the corresponding local communication (S220). In other words, when receiving, from the edge network device 2, an inquiry about the control processing of the packet in the local communication in which the global address is "X" among the local communication controlled by the SDN controller 1', the terminal identification information specifying processing unit 12' specifies the local communication. Then, the terminal identification information specifying processing unit 12' of the SDN controller 1' extracts the MAC address "ma" of the transmission source terminal from the packet in the local communication including the global address "X". The MAC address "ma" of the suspicious terminal which is the client terminal 3 damaged by the attack from the illegal attack server 5 can be acquired accordingly.

Then, the security processing unit 13' passes the MAC address "ma" specified by the terminal identification information specifying processing unit 12' to the edge network device 2, and further passes the control instruction to perform disconnection or the like of the communication with the client terminal 3 having the MAC address "ma" (that is, the suspicious terminal), and the edge network device 2 performs disconnection or the like of the communication with the client terminal 3 having the MAC address "ma" (S230). Furthermore, the security processing unit 13' writes, based on the control instruction, a rule to perform the control to disconnect (discarding or the like) the packet having the MAC address "ma" of the transmission source in a rule table, such as the flow entry in the edge network device 2. Thereafter, the packet having the MAC address "ma" is disconnected by the edge network device 2 without inquiring of the SDN controller 1' accordingly.

By the above processing by the security processing unit 13', the control processing of communication can be performed in units of suspicious terminals. Especially, since the edge network device 2 controls the communication based on the MAC address of the suspicious terminal, disconnection or the like of the communication only of the suspicious terminal is performed when the client terminals 3 communicate through the edge network device 2, and thereby it is possible for the same edge network device 2 not to affect the communication of the normal client terminal 3. As a result, similarly to FIG. 5, although the edge network device 2 is used by the client terminals 3, it is possible to obtain a technical effect to perform disconnection or the like of the communication only of the MAC address "ma" of the client terminal 3 specified as the suspicious terminal by the terminal identification information specifying processing unit 12'.

Furthermore, it is possible to obtain the same technical effect as the case in FIG. 6 of the first embodiment. In other words, since the terminal identification information specifying processing unit 12' specifies the MAC address "ma" of the suspicious terminal, the SDN controller 1' manages the MAC address to whose communication is the target to perform disconnection or the like, and the security processing unit 13' notifies each edge network device 2 in the private network of the MAC address. Each edge network device 2 which receives the notification writes a rule to perform the control to disconnect the packet having the MAC address "ma" of the transmission source in the rule table, such as a flow entry. By the above processing, when the suspicious terminal changes the edge network device, the new edge network device 2 acquires the MAC address "ma" at the time of communication with the suspicious terminal, and it is possible to disconnect the communication without inquiring of the SDN controller 1'.

Similarly, when a fixed IP address is assigned by a user who uses the suspicious terminal, the suspicious terminal is controlled with the MAC address, and it is possible to perform disconnection or the like of the communication with the edge network device 2.

With the configuration of the SDN controller 1' in the present embodiment, unlike that in the first embodiment, it is possible to specify terminal identification information, such as the MAC address of the suspicious terminal, and to control the communication of the suspicious terminal without specifying the local address of the client terminal 3 which is the suspicious terminal in the private network.

INDUSTRIAL APPLICABILITY

By using an SDN controller 1 according to the embodiments of the present invention, it is possible to specify a client terminal 3 damaged in a private network. Then, by specifying the damaged client terminal 3, it is possible to prevent infection or the like to other client terminals 3. Furthermore, the embodiments of the present invention can be applied when an IP address of the client terminal 3 is changed by moving, for example, roaming.

What is claimed is:

1. A software defined network (SDN) controller having a processor and addressable memory used in a private network constructed with an SDN, the SDN controller causes a computer to function as:
   an address information specifying processing unit having a processor and addressable memory configured to specify a local address which is a communication partner in a coincident communication by monitoring, based on a global address of an illegal attack server received from a threat detection system which is present outside the private network, communications in the private network controlled by the SDN controller, and correlating a global address in each communication and the received global address;
   a terminal identification information specifying processing unit having a processor and addressable memory configured to specify terminal identification information on a client terminal to which the specified local address is assigned; and
   a security processing unit having a processor and addressable memory configured to perform, based on the specified terminal identification information, for an edge network device of two or more edge network devices, a control instruction to perform predetermined control processing to interrupt communication of the client terminal;
   wherein each edge network device of the two or more edge network devices comprises a respective rule table, wherein each rule table comprises one or more rules;
   wherein processing of a packet from the client terminal having the terminal identification information is suspended if a rule to control the packet received from the client terminal having the terminal identification information is not in the rule table of the edge network device;
   wherein the suspended packet is processed according to a control instruction from the SDN controller;
   wherein the SDN controller writes, as the control processing, a rule to discard the packet from the client terminal having the terminal identification information in the rule table of the edge network device;
   wherein the security processing unit notifies each edge network device of the two or more edge network devices to write the rule to discard the packet from the client terminal having the terminal identification information in the respective rule table of each edge network device;
   wherein the packet from the client terminal having the terminal identification information is discarded according to the written rule when the rule is in the rule table of the edge network device without inquiring of the SDN controller; and
   wherein when a fixed IP address is assigned by a user who uses the client terminal, the client terminal is controlled with the terminal identification information, wherein the terminal identification information includes at least a MAC address, and the edge network device disconnects or isolates communication of the client terminal.

2. The SDN controller according to claim 1, wherein the SDN controller notifies, as the control processing, the specified terminal identification information to another edge network device in the private network managed by the SDN controller, and wherein the edge network device disconnects or isolates communication of the client terminal without inquiring of the SDN controller.

3. The SDN controller according to claim 1, wherein the SDN controller further performs, as the control processing, any one or more of virus detection, virus isolation, and virus repair.

4. A software defined network (SDN) controller having a processor and addressable memory used in a private network constructed with an SDN, the SDN controller causes a computer to function as:
 a terminal identification information specifying processing unit having a processor and addressable memory configured to specify terminal identification information on a client terminal which is a transmission source in a coincident communication by monitoring, based on a global address of an illegal attack server received from a threat detection system which is present outside the private network, communications in the private network controlled by the SDN controller, and correlating a global address in each communication and the received global address; and
 a security processing unit having a processor and addressable memory configured to perform, based on the specified terminal identification information, relative to an edge network device of two or more edge network devices, a control instruction to perform predetermined control processing to interrupt communication of the client terminal;
 wherein each edge network device of the two or more edge network devices comprises a respective rule table, wherein each rule table comprises one or more rules;
 wherein processing of a packet from the client terminal having the terminal identification information is suspended if a rule to control the packet received from the client terminal having the terminal identification information is not in the rule table of the edge network device;
 wherein the suspended packet is processed according to a control instruction from the SDN controller;
 wherein the SDN controller writes, as the control processing, a rule to discard the packet from the client terminal having the terminal identification information in the rule table of the edge network device;
 wherein the security processing unit notifies each edge network device of the two or more edge network devices to write the rule to discard the packet from the client terminal having the terminal identification information in the respective rule table of each edge network device;
 wherein the packet from the client terminal having the terminal identification information is discarded according to the written rule when the rule is in the rule table of the edge network device without inquiring of the SDN controller; and
 wherein when a fixed IP address is assigned by a user who uses the client terminal, the client terminal is controlled with the terminal identification information, wherein the terminal identification information includes at least a MAC address, and the edge network device disconnects or isolates communication of the client terminal.

5. The SDN controller according to claim 4, wherein the SDN controller notifies, as the control processing, the specified terminal identification information to another edge network device in the private network managed by the SDN controller.

6. The SDN controller according to claim 4, wherein the SDN controller further performs, as the control processing, any one or more of virus detection, virus isolation, and virus repair.

* * * * *